United States Patent
Belknap et al.

(10) Patent No.: US 7,970,755 B2
(45) Date of Patent: Jun. 28, 2011

(54) TEST EXECUTION OF USER SQL IN DATABASE SERVER CODE

(75) Inventors: Peter Belknap, Redwood City, CA (US); Khaled Yagoub, Newark, CA (US); Karl Dias, Foster City, CA (US); Benoit Dageville, Foster City, CA (US)

(73) Assignee: Oracle Int'l. Corp., Redwood Shores, CA (US)

( * ) Notice: Subject to any disclaimer, the term of this patent is extended or adjusted under 35 U.S.C. 154(b) by 375 days.

(21) Appl. No.: 12/217,249

(22) Filed: Jul. 2, 2008

(65) Prior Publication Data

US 2010/0005340 A1    Jan. 7, 2010

(51) Int. Cl.
*G06F 7/00* (2006.01)
*G06F 17/30* (2006.01)

(52) U.S. Cl. .......................... 707/713; 707/736; 707/805

(58) Field of Classification Search .................. 707/713, 707/718, 719, 999.002, 736, 805
See application file for complete search history.

(56) References Cited

U.S. PATENT DOCUMENTS

| | | | |
|---|---|---|---|
| 6,014,657 A * | 1/2000 | Weida et al. | 707/999.002 |
| 6,092,189 A * | 7/2000 | Fisher et al. | 713/1 |
| 2003/0046673 A1 * | 3/2003 | Copeland et al. | 717/163 |
| 2004/0236722 A1 * | 11/2004 | Waas et al. | 707/2 |
| 2005/0097091 A1 * | 5/2005 | Ramacher et al. | 707/3 |
| 2005/0240624 A1 * | 10/2005 | Ge et al. | 707/104.1 |
| 2006/0195416 A1 * | 8/2006 | Ewen et al. | 707/2 |
| 2009/0158292 A1 * | 6/2009 | Rattner et al. | 718/106 |

* cited by examiner

*Primary Examiner* — John Breene
*Assistant Examiner* — Phong Nguyen
(74) *Attorney, Agent, or Firm* — Kraguljac & Kalnay, LLC

(57) ABSTRACT

Systems, methods, and other embodiments associated with test execution of user SQL in server code are described. One example method includes producing a reproduced execution environment that reproduces a portion of an execution environment in which a user SQL runs. The example method may also include running the user SQL in the reproduced execution environment and capturing a statistic associated with performance of the user SQL while the user SQL runs in the reproduced execution environment. The method may conclude by storing, displaying, and/or providing a signal concerning the statistic.

17 Claims, 7 Drawing Sheets

TEST EXECUTION OF USER SQL IN DATABASE SERVER CODE

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Some conventional database systems offer Structured Query Language (SQL) diagnosis and management products. These conventional products aim to help customers complete tasks including understanding and resolving performance issues, diagnosing faults in the product, and running tests to see how their system will behave after performing some change. Conventionally, SQL management products have not tested user SQL statements within server code. Since the SQL statements are not executed within server code, there is a lower certainty and/or confidence in advice based on the resulting data. The certainty and/or confidence is negatively impacted by the inability to execute the test code in a realistic environment and to produce reproducible, verifiable statistics. Indeed, conventional approaches may be unable to prove their advice. Running the SQL statement externally will create issues, including causing contention with other database activity due to acquisition of row locks, modifying the database state which will cause other database sessions to do extra work to see a version of the database before these changes were made, and mixing the statistics collected for normal SQL executions run by the application with those collected for testing.

Several challenges have frustrated attempts to test user SQL statements within server code. For example, it has been difficult, if possible at all, to collect reliably certain information about SQL statements to be tested. A set of SQL statements may be referred to as "an SQL" and/or as "SQLs". Conventional approaches to collecting statistics for a single user's activity involve tracing, which can negatively impact performance itself, or attempting to capture performance information from the system's dynamic performance views, which can be unreliable and also can mix user statistics with the test statistics when cursors are shared. Another challenge is reproducing the original execution environment when test-executing the SQL. This is challenging enough when running the SQL on the same system, but becomes all the more challenging when executing on a secondary test system. The environment is a very complex and heterogeneous entity. Therefore, defining, capturing, transporting, and reproducing an environment is challenging. Additionally, it has been difficult, if even possible, to execute SQLs without causing a noticeable impact on the system on which the testing occurs. Noticeable impacts may be caused by acquiring row locks, modifying user data when running data manipulation language statements, which will impact those statements that come later, and so on. Tools that execute user SQLs in a way that can impact a production workload will be less useful than tools that prevent this harmful interaction. Like a set of SQL statements may be referred to as "an SQL", a set of data manipulation language (DML) statements may be referred to as "a DML".

When executing a single SQL statement, conventional systems are challenged to force the SQL to complete or abort within a specific time limit. While not critical for normal user executions of SQL statements being run by an application where all SQLs are expected to run to completion no matter how long it takes, performance and diagnostic tools that are built into the database cannot afford to run SQL statements for an unspecified amount of time because this would cause noticeable harm to the system. Therefore performance and diagnostic tools determine how much time the SQL statement should be allowed to run for and then terminate the execution once the execution reaches this time limit.

Another challenge for conventional systems has been finding an effective way to measure and compare the performance of different execution plans for the same user SQL. This involves reproducing the set of execution plans of interest, executing them, capturing relevant performance metrics for those executions only, and choosing an appropriate set of metrics that can be used to judge the goodness of the different plans and compare them to each other. Yet another challenge for conventional systems has been discovering an approach to manage the execution of multiple plans for the same user SQL in a scheme that addresses fairness in how resources are split between plans and accuracy in how the plans are compared and evaluated. Time resources need to be used carefully so that all plans will complete in a reasonable amount of time with a useful result that facilitates identifying which plan has the best performance. In some cases, depending on which plans complete and which do not, comparisons may or may not be valid. Example systems account for the (in)validity of comparisons.

Analyzing the results of user SQL statements is also a challenge. Typical interfaces for running SQLs require the application to know in advance the format of the results of the SQL and to define locations in memory to place results. Doing this in a generic fashion is not trivial but it is useful for tools seeking to analyze the results of the SQL execution to, for example, assure that all execution plans for the same query return the same data. Additional challenges are added because some of the information that an analysis tool would like to examine is only available inside the database while the SQL is executing.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
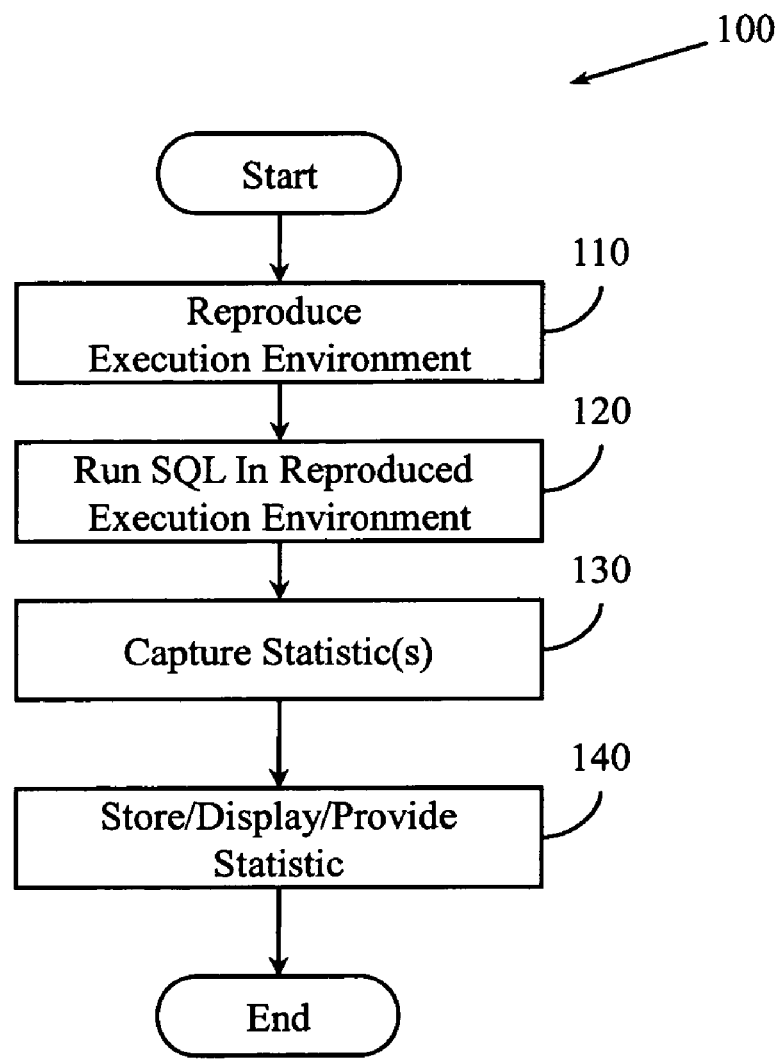
FIG. 1 illustrates an example method associated with test execution of SQLs in server code.

Executing user SQLs within server code facilitates measuring and comparing the performance and correctness of different execution approaches. Executing SQLs within server code also facilitates increasing confidence in advice based on test results because the advice is provable. Example systems and methods build an execution framework into the SQL execution engine of a database. In effect, SQLs can be executed in their own special sandbox to minimize the impact of the test on others around them.

Example systems and methods employ interfaces that facilitate reproducing conditions significant to executing an SQL statement. The conditions are reproduced based, at least in part, on optimizer parameter values, bind values, real user data, and so on. The interfaces facilitate providing data concerning the conditions to the mock execution framework built in the SQL execution engine of the database. When test execution takes place on a system different than the one where the information was captured, it can be transmitted over a network to the other system. Example systems and methods may capture plan reproduction information (e.g., information necessary to reproduce the execution plan) and later use the plan reproduction information to reproduce plans when executing the SQL with the goal of comparing the performance. This captured plan reproduction information can be used to force specific execution plans identified by a user/client. Thus, example systems and methods facilitate reproducing an execution environment and executing SQLs in the reproduced environment. The reproduced environment may even be moved between databases to facilitate remote execution.

An execution environment is a complicated thing that depends on many factors that vary across database vendors. However, the problem space associated with reproducing an execution environment can be reduced by focusing on a well defined set of elements including, for example, bind values and parameter values. After reproducing as much of the meaningful parts of an environment as possible and/or desired, example systems and methods execute SQLs using the reproduced environment and capture statistics and data that are reproducible. The reproducibility supports provability which in turn facilitates increasing the confidence in advice provided.

With a reproduced execution environment available, example systems and methods can be configured to reduce the impact of SQLs being tested on other database activity. This configuration is facilitated because the SQLs are executed within the database, rather than relying on external APIs. In one example configuration, DMLs may execute without acquiring row locks or modifying user data, when the SQL execution engine is instrumented to do so. This configuration facilitates isolating test execution process runs to prevent impacting other parts of the database system.

Example systems and methods may acquire SQL-level statistics related to the execution of an individual isolated query. The statistics may be collected substantially immediately after SQLs and/or portions of SQLs execute, without risk of imprecision or loss. These statistics may be acquired without impacting other database activity because row locks are not acquired, user data is not acquired, cursors are not shared with user cursors, and so on. In one example, the "cost" of acquiring statistics will only be charged to the analyzer.

Example systems and methods can control server code to be notified at different points in the execution of an SQL statement. Thus, information that may only be temporarily available during execution of SQLs can be acquired. Thus, statistics may be captured for specific SQLs for specific executions at times controllable by the user/tester. Conventional systems that test SQLs outside the server code cannot acquire this type of data.

With the rich and varied information and statistics acquired from running test executions of SQL statements in the reproduced environment, reproducible and deterministic comparisons may be made. In one example, different execution plans for the same SQL can be compared in a reproducible and deterministic manner, even across different environmental situations. In different examples, different metrics may be compared. Thus, part of designing a test execution plan may include selecting metrics to compare and defining rules/tests to define when one test execution is "better" than another.

Example systems and methods may have different meaningful and reproducible statistics available. Example systems and methods may define metrics that are reproducible and that can be used to make reliable, trustworthy comparisons. In one example, a central processing unit (CPU) time statistic is collected and analyzed. This statistic may track how many clock cycles were used to execute an SQL and/or a portion of an SQL. In one example, a new plan will be considered to be better than an old plan if the CPU statistics is better than a previous CPU statistic. The previous CPU statistic may be referred to as a baseline.

The CPU time statistic is generally reproducible. Thus, a threshold decision about whether execution plans should and/or can be compared may ask whether the CPU statistic for a plan is better than a baseline. If the CPU statistic has improved, then additional factors and statistics may be analyzed. For example, systems and methods may also collect and analyze statistics concerning buffer gets (logical reads) to account for the input/output (I/O) performance of tested SQLs and/or execution plans. To make timing statistics more reliable, systems can execute the same plan multiple times and average the statistics out across multiple executions. Thus, example systems and methods may answer not only the question of whether one user SQL is better than another SQL or whether one user SQL execution plan is better than another SQL execution plan, but may also answer the question of how it is better.

In one example, reasoned and justifiable decisions concerning the performance benefit of a change to a user SQL can be based, at least in part, on the CPU time statistics and/or the I/O performance statistics. In one example, test executions may be compared to a baseline while in another example test executions may be compared to each other. Picking proper execution statistics facilitates increasing the legitimacy of the comparison.

Example systems and methods facilitate managing the executions of multiple different execution plans in a way that prevents the execution of one plan from impacting the accuracy of measurements associated with another plan. Different plans for the same SQL represent different optimization strategies. The performance of different execution plans can be compared to evaluate which strategy is the best. In one example, executions are interleaved in a loop-based manner. Different amounts of time can be allocated to different options. Time limits can be allocated to different options. Time limits can be progressively increased until a final decision is reached. Interleaving facilitates spreading available CPU time and other system resources between plans. The plans run serially, not in parallel, and may be executed in rounds. Running the plans in parallel would introduce a significant impact on the production system, which would be unacceptable to many customers. Decisions concerning comparative performance can be made at the ends of rounds. Consider a testing engine that only has a certain amount of time to complete a test execution. This amount of time may have been purchased, may have been identified as being available at a certain time of day when testing is to be performed, may have been configured by an administrator, and so on. In the available time, the testing engine may be tasked with completing X execution plans. One test consideration concerns how to spend the available time wisely. One approach involves identifying a "winner" as quickly as possible. Another approach involves removing "losers" as quickly as possible to allow a greater percentage of the testing time to be available for potential winners. A winner may be identified when an execution plan appears to be outperforming a baseline by a pre-determined, configurable amount (e.g., 10%, 50%, 100%, 250%). A loser may be identified when an execution plan appears to be underperforming a baseline. A decision concerning both winners and losers may be made after a pre-determined, configurable number of rounds, after a pre-determined, configurable amount of CPU time, and so on.

In one example, statistics can be compared between completed plans, between a completed plan and a partially completed plan(s), between partially completed plans, and so on. In different examples the statistics may be compared to a baseline and/or to each other. When compared to a baseline, a "winner" may be chosen by identifying a plan that beats the baseline by the greatest margin.

Since executions are interleaved and thus run in serial, and since "in execution" statistics are available, partial performance of execution plans can be compared. Partial performance analysis facilitates identifying early convergence for a solution and thus may prevent wasted execution time. In one example, a user SQL may be halted if it is considered to be taking too much time and/or too many resources. When multiple plans are executing, a plan(s) may be eliminated from further (e.g., complete) execution based on partial performance analysis. Different amounts of time can be allocated to different plans based on the origin of the plan. With the ability to compare statistics associated with executing plans at various points (e.g., partial completions) and to stop execution of one plan and to reallocate resources (e.g., CPU time) to another plan, different types of complexity and comparisons can be managed. For example, complexity associated with testing multiple plans under a specified time limit can be managed so that potentially improving plans are given the bulk of testing time while plans identified to not potentially improve performance can be triaged from the plans.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: static or synchronous RAM.
ROM: read only memory.
EEPROM: electrically erasable PROM.
SQL: structured query language.
USB: universal serial bus.
XML: extensible markup language.
WAN: wide area network.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic" as used herein, includes but is not limited to hardware, firmware, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

FIG. 1 illustrates a method 100 associated with test execution of user SQL in server code. Method 100 may include, at 110, producing a reproduced execution environment that reproduces at least a portion of an execution environment in which a user SQL runs. In one example, producing the reproduced execution environment includes creating a mock execution framework in an SQL execution engine of a database. The mock execution framework may be built from environment data concerning the execution environment in which the user SQL runs. This environment data may be provided to the SQL execution engine of the database through, for example, an application programming interface (API). The environment data may include, for example, bind values, optimizer parameter values, real user data values, and so on. While the reproduced execution environment and mock execution framework may be associated with an SQL execution engine in a first database, in one example the reproduced execution environment may be migrated to a remote database.

Method 100 may also include, at 120, running the user SQL in the reproduced execution environment without impacting workload performance. In one example, running the user SQL in the reproduced execution environment may include preventing acquisition of row locks, preventing modification of user data, preventing sharing of a cursor, and preventing other actions that may significantly impact other portions of the database. In one example, running the user SQL in the reproduced execution environment may include executing multiple execution plans for a single user SQL. The execution plans may be interleaved using loop-based serial time slicing, potentially allocating time to different plans based on the way the plan was produced. Statistics may be acquired for each of the multiple execution plans. Thus it may be possible to compare the multiple execution plans to baseline statistics and/or to each other depending on whether errors or time limits are encountered. One skilled in the art will appreciate that plan execution may need to be restarted with a higher time limit if plans run out of time with the initial time limit chosen.

Method 100 may also include, at 130, capturing a statistic associated with performance of the user SQL while the user SQL runs in the reproduced execution environment. The statistic may be an SQL-level statistic. For example, the statistic may be, for example, a CPU statistic, an I/O statistic, and so on. The CPU statistic may track, for example, the number of clock cycles consumed by a user SQL. The I/O statistics may track, for example, the number of logical reads and/or writes performed by a user SQL. Method 100 may also include, at 140, producing a concrete, tangible, real world result by storing the statistic, displaying the statistic, and/or providing a tangible signal concerning the statistic. Plans may be executed multiple times to measure the average-case performance for the SQL to increase the quality of timing statistics.

In one example, a method may be implemented as computer executable instructions. Thus, in one example, a computer-readable medium may store computer executable instructions that if executed by a machine (e.g., processor) cause the machine to perform method 100. While executable instructions associated with the method 100 are described as being stored on a computer-readable medium, it is to be appreciated that executable instructions associated with other example methods described herein may also be stored on a computer-readable medium.

Figure 2:
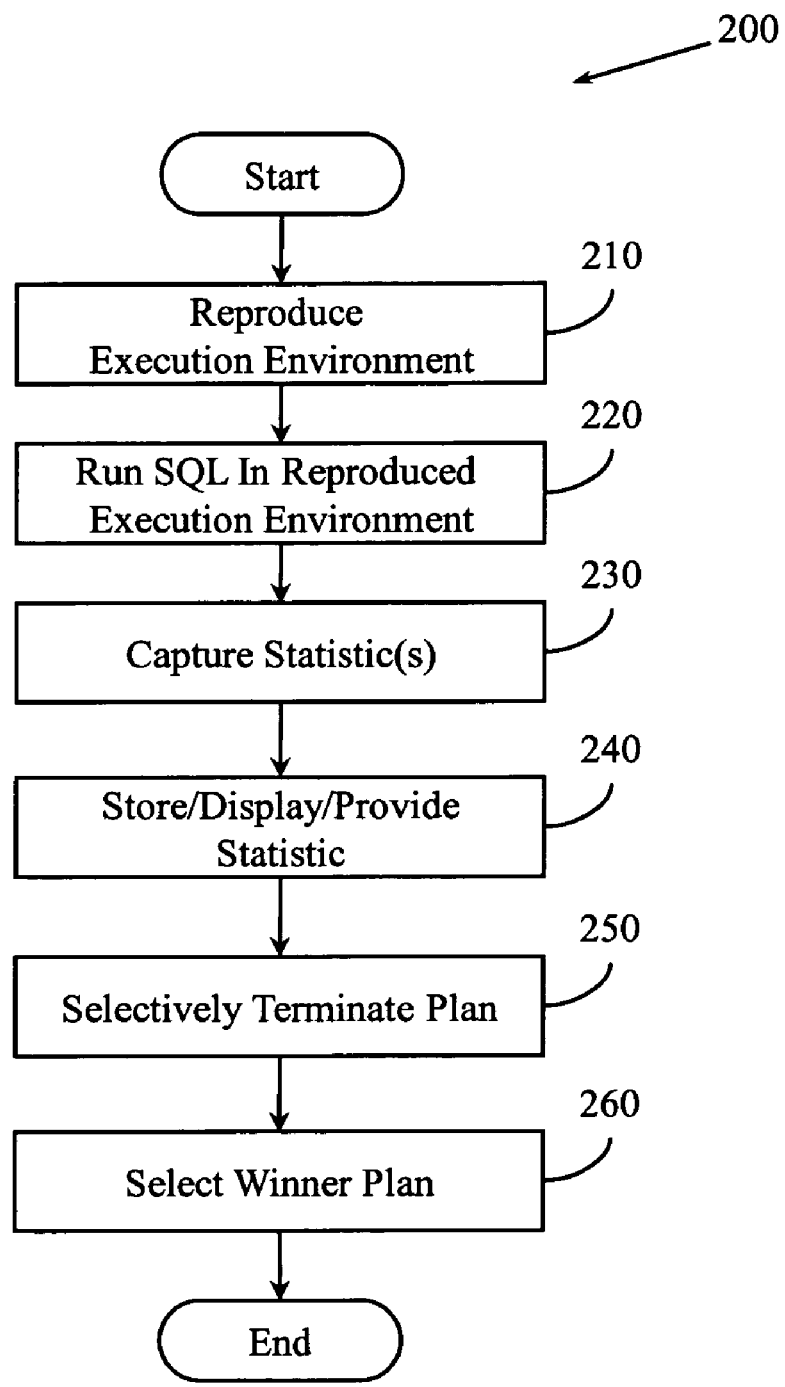
FIG. 2 illustrates an example method associated with test execution of SQLs in server code.

FIG. 2 illustrates a method 200 associated with test execution of SQLs in server code. Method 200 includes several actions similar to those described in connection with method 100 (FIG. 1). For example, method 200 includes reproducing an execution environment at 210, running SQLs in server code as controlled by the reproduced execution environment at 220, capturing statistics at 230, and storing/displaying/providing statistics at 240. However, method 200 may include additional actions. For example, method 200 may also include, at 250, selectively terminating an execution plan based, at least in part, on a comparison to a baseline performance. For example, if the execution plan has fallen more than a pre-determined percentage behind a baseline performance, then the execution plan may be terminated. In one example, if the execution plan at any point performs worse than a baseline performance with respect to a CPU statistic, then the execution plan may be terminated. In one example, an execution plan may be compared to a baseline performance to determine whether to terminate the execution plan. In another example, an execution plan may be compared to other execution plans to determine whether the execution plan is terminated.

Method 200 may also include, at 260, selecting an execution plan as an improved execution plan based, at least in part, on a comparison to a baseline performance. In one example, an execution plan may be compared to a baseline performance to determine whether the execution plan is selected as an improved execution plan. In another example, an execution plan may be compared to other execution plans to determine whether the execution plan is selected as an improved execution plan. Before being compared to other execution plans, an execution plan may first have to pass a threshold test of being better than a baseline performance.

In different examples, the comparisons made at 250 and at 260 may be made at different times. For example, an execution plan may be compared to a baseline performance at times including, after a time slice, after a partial performance of a plan, and after completion of a plan. In the example where an execution plan is compared to either a baseline or another execution plan after a time slice and/or after a partial performance, method 200 may selectively reallocate a test execution resource (e.g., cpu time) between executing test plans. The reallocation may be based, at least in part, on a comparison of the executing test plans, on analysis of a plan attribute (e.g., originally produced algorithm), and so on.

Figure 3:
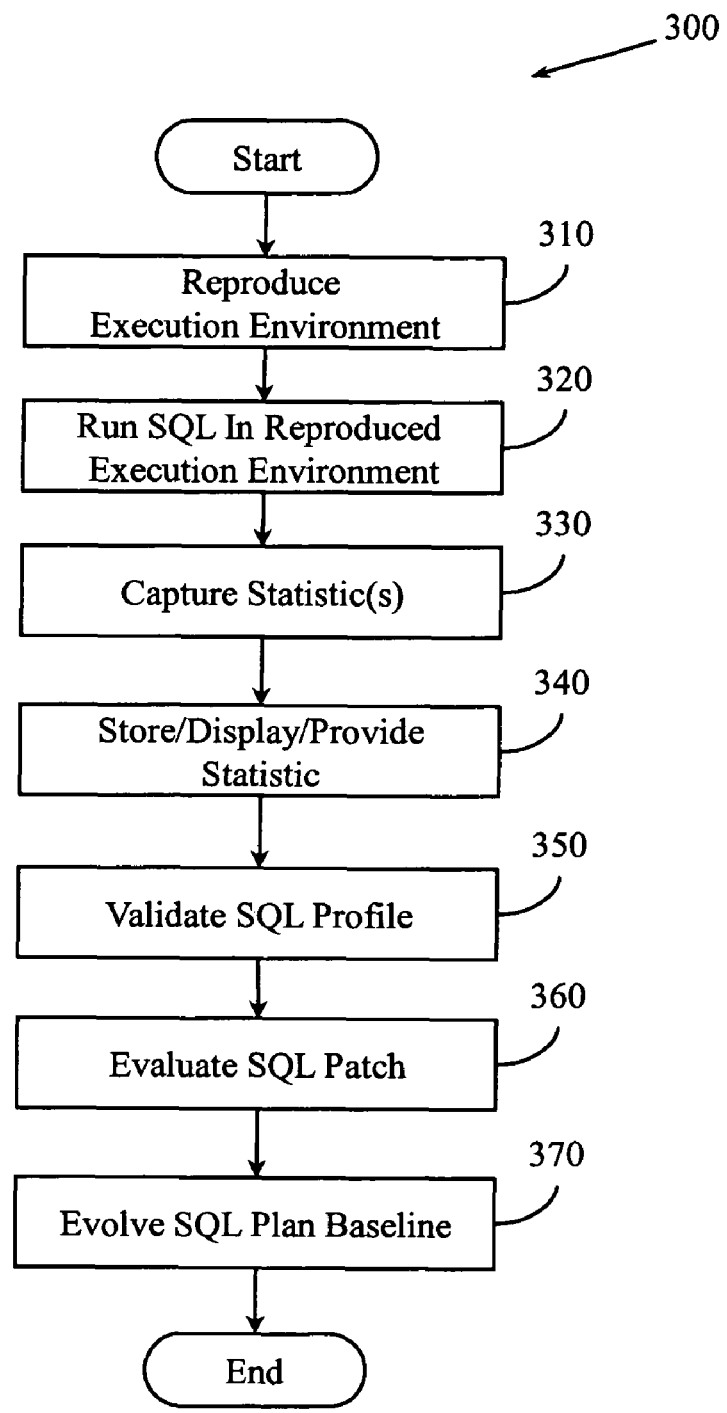
FIG. 3 illustrates an example method associated with test execution of SQLs in server code.

FIG. 3 illustrates a method 300 associated with test execution of user SQL in server code. Method 300 includes several actions similar to those described in connection with method 200 (FIG. 2). For example, method 300 includes reproducing an execution environment at 310, running SQLs in server code as controlled by the reproduced execution environment at 320, capturing statistics at 330, and storing/displaying/providing statistics at 340. However, method 300 may include additional actions. For example, method 300 may also include, at 350, validating an SQL profile recommendation based, at least in part, on the statistic. Validating the SQL profile recommendation may facilitate increasing confidence in advice provided in response to analyzing SQLs. In one example the validation may include reproducing optimizer estimate statistics over a set of test executions. Such a method involves choosing statistics that provide a meaningful and repeatable measurement of plan goodness and using those statistics to decide whether the plan with the SQL profile is better than the baseline.

Method 300 may also include, at 360, determining whether an SQL patch fixes a wrong results issue associated with the user SQL and/or a crash issue associated with the user SQL. In one example the determination may be based on the statistics acquired during a run. In another example the determination may be made based on evaluating the results produced by a test execution. Since the test execution is run in a mock execution framework within server code, more accurate results may be attainable than through conventional systems.

Method 300 may also include, at 370, evolving an SQL plan baseline based on a comparison of the performance of the user SQL with the plan baseline and the performance of the user SQL without the plan baseline. This action includes running an SQL plan more than once. A test execution with the plan baseline can be performed and a test execution without the plan baseline can be performed. Statistics for the different test executions can then be compared to make a decision concerning evolving the SQL plan baseline. This method also includes picking correct statistics and using them to measure and evaluate plan goodness. Evolving the SQL plan baseline may include, for example, determining an order in which events are to occur, and so on.

Thus, while method 300 is illustrated proceeding linearly from start to finish, method 300 may include running multiple test executions, amending execution plans, rerunning the amended execution plans, and so on. Therefore, the capturing of statistics at 330 may occur multiple times and at multiple locations throughout method 300. For example, statistics may be measured before and after a change to an execution plan.

Figure 4:
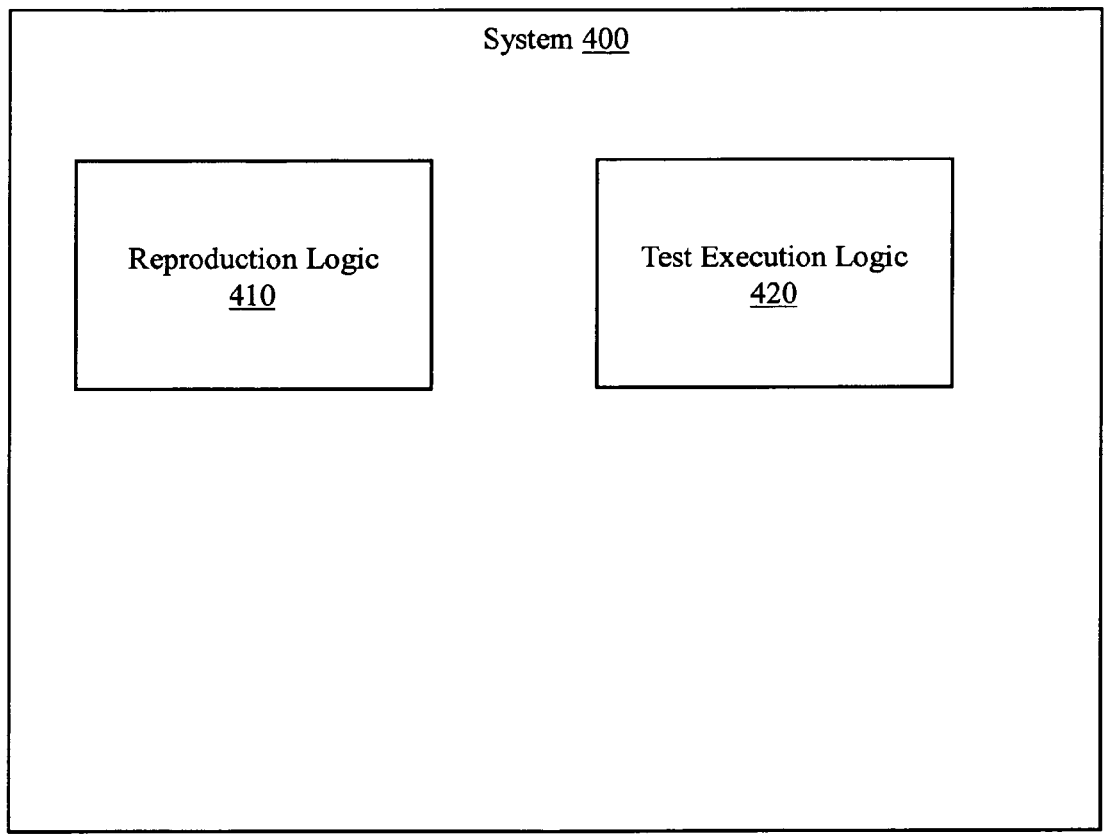
FIG. 4 illustrates an example system associated with test execution of SQLs in server code.

FIG. 4 illustrates a system 400 associated with test execution of user SQL in server code. System 400 may include a reproduction logic 410. Reproduction logic 410 may create a reproduced execution environment for executing a user SQL in server code. In one example, the reproduction logic 410 creates a mock execution framework in an SQL execution engine of a database. The mock execution framework is based, at least in part, on environment data concerning an execution environment in which the user SQL runs. This environment data may include, for example, a bind value, an optimizer parameter value, a real user data value, and so on.

System 400 may also include a test execution logic 420. Test execution logic 420 may run the user SQL in server code. Test execution logic 420 may also acquire and store a set of statistics concerning the user SQL as run in the reproduced execution environment in the server code. In one example, the test execution logic 420 runs the user SQL without acquiring row locks, without modifying user data, and without acquiring a cursor associated with user data. This facilitates minimizing the impact on other portions of a database of running test execution plans for SQLs. The test execution logic 420 may execute multiple execution plans for a single SQL. The multiple execution plans may be interleaved using loop-based serial time slicing. The statistics acquired for the multiple execution plans may include a CPU statistic and an I/O statistic. The test execution logic 420 may terminate an execution plan based, at least in part, on a comparison of the set of statistics to a set of baseline performance statistics. In one example, the system 400 understands its own statistics and thus can determine which statistics can be reliably compared.

Additionally, the test execution logic 420 may select an execution plan as an improved execution plan based, at least in part, on a comparison of the set of statistics to a set of baseline performance statistics. The test execution logic 420 may make the comparisons and decisions at different points in time. For example, the test execution logic 420 may make comparisons at times including after a time slice, after a partial performance of a plan, and after completion of a plan.

Figure 5:
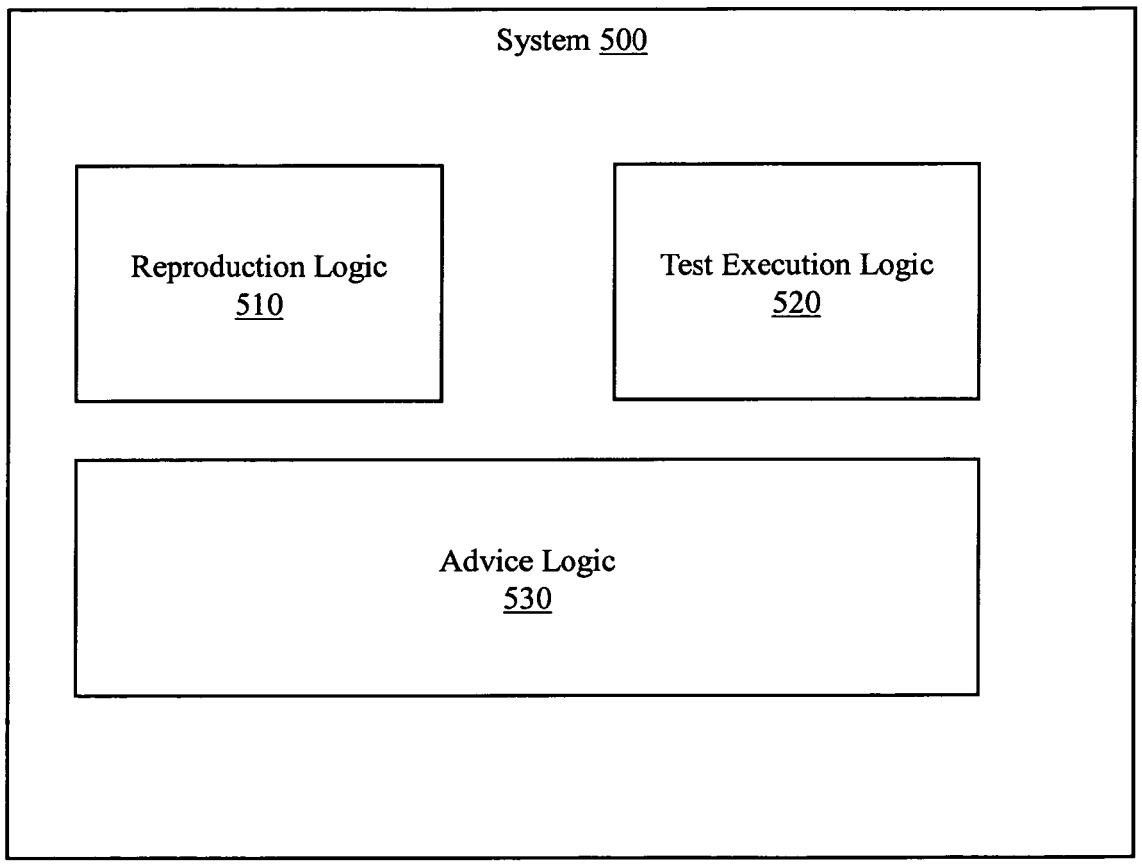
FIG. 5 illustrates an example system associated with test execution of SQLs in server code.

FIG. 5 illustrates a system 500 associated with test execution of user SQL in server code. System 500 includes several items similar to those described in connection with system 400 (FIG. 4). For example, system 500 includes a reproduction logic 510 and a test execution logic 520. However, system 500 includes an additional element, an advice logic 530. Advice logic 530 provides a recommendation concerning modification of a user SQL that is tested in server code by system 500. The recommendation is based, at least in part, on the set of statistics acquired by system 500 while the user SQL is run in the server code. One skilled in the art will appreciate that an SQL execution plan may have many configurable options with respect to, for example, the order in which actions are taken and thus one example recommendation may concern the re-ordering of certain actions.

Figure 6:
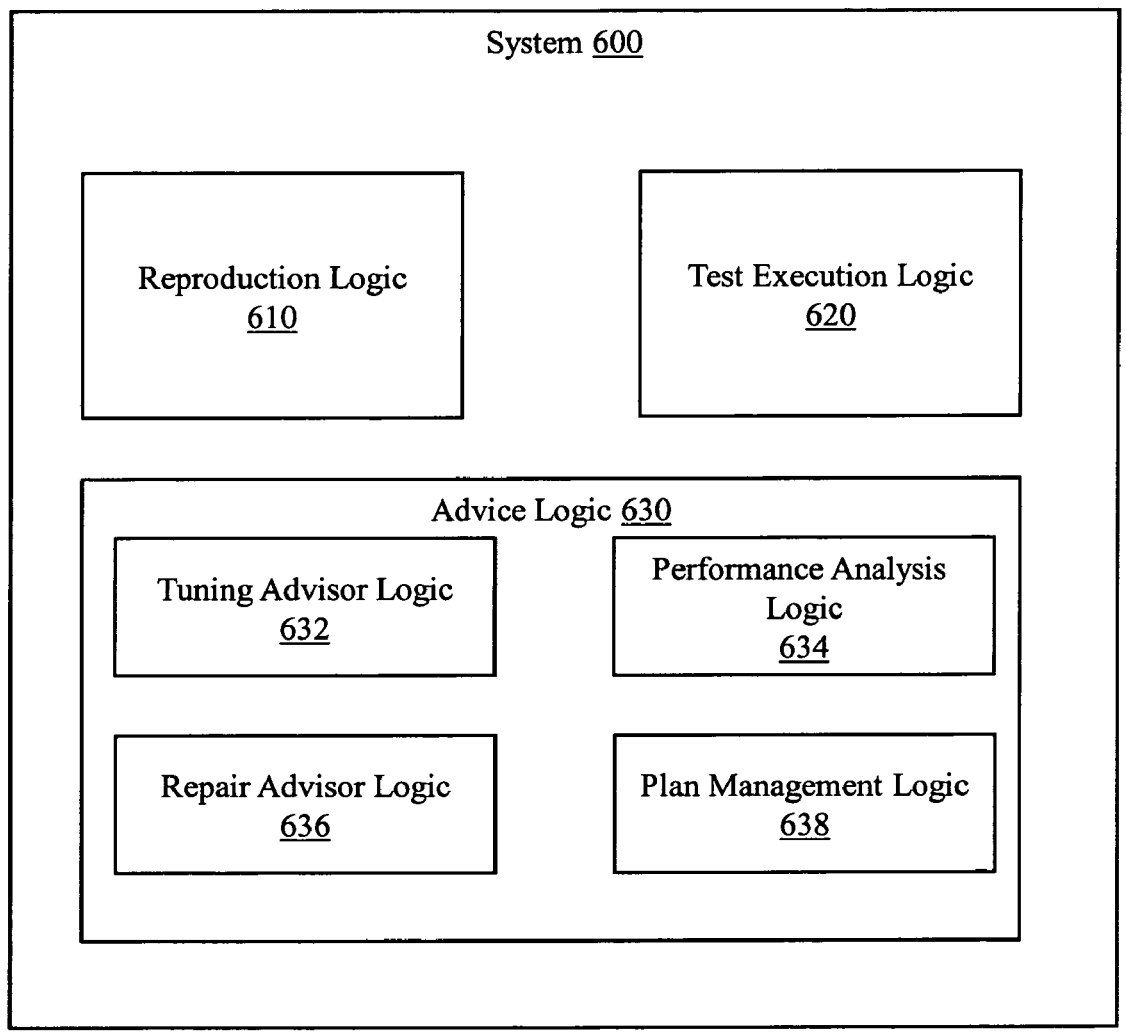
FIG. 6 illustrates an example system associated with test execution of SQLs in server code.

FIG. 6 illustrates a system 600 that facilitates test execution of SQLs in server code. System 600 includes several items similar to those described in connection with system 500 (FIG. 5). For example, system 600 includes a reproduction logic 610, a test execution logic 620, and an advice logic 630. However, advice logic 630 includes additional sub-logics.

In one example, advice logic 630 includes an SQL tuning advisor logic 632. The tuning advisor logic 632 is to validate an SQL profile recommendation based, at least in part, on the set of statistics. Advice logic 630 also includes an SQL performance analysis logic 634. SQL performance analysis logic 634 may measure the set of statistics before and after a change to an execution plan. By measuring before and after changes, a determination can be made as to whether the changes were beneficial.

Advice logic 630 also includes an SQL repair advisor logic 636. Repair advisor logic 636 is to determine whether an SQL patch fixes an issue with an SQL. For example, an SQL may have experienced a wrong results and/or a crash issue. Thus, repair advisor logic 636 may monitor execution of a patch to an SQL to determine whether the wrong results issue and/or the crash issue are resolved. Advice logic 650 also includes an SQL plan management logic 638 to evolve an SQL plan baseline based on a comparison of a first set of statistics acquired with the plan baseline in place and a second set of statistics acquired without the plan baseline in place. Comparing the statistics from the two executions facilitates determining whether a change to an SQL plan baseline should be made. While advice logic 630 is illustrated having all four sub-logics (632, 634, 636, 638), in different examples advice logic 630 may include different numbers and/or combinations of the sub-logics (632, 634, 636, 638).

Figure 7:
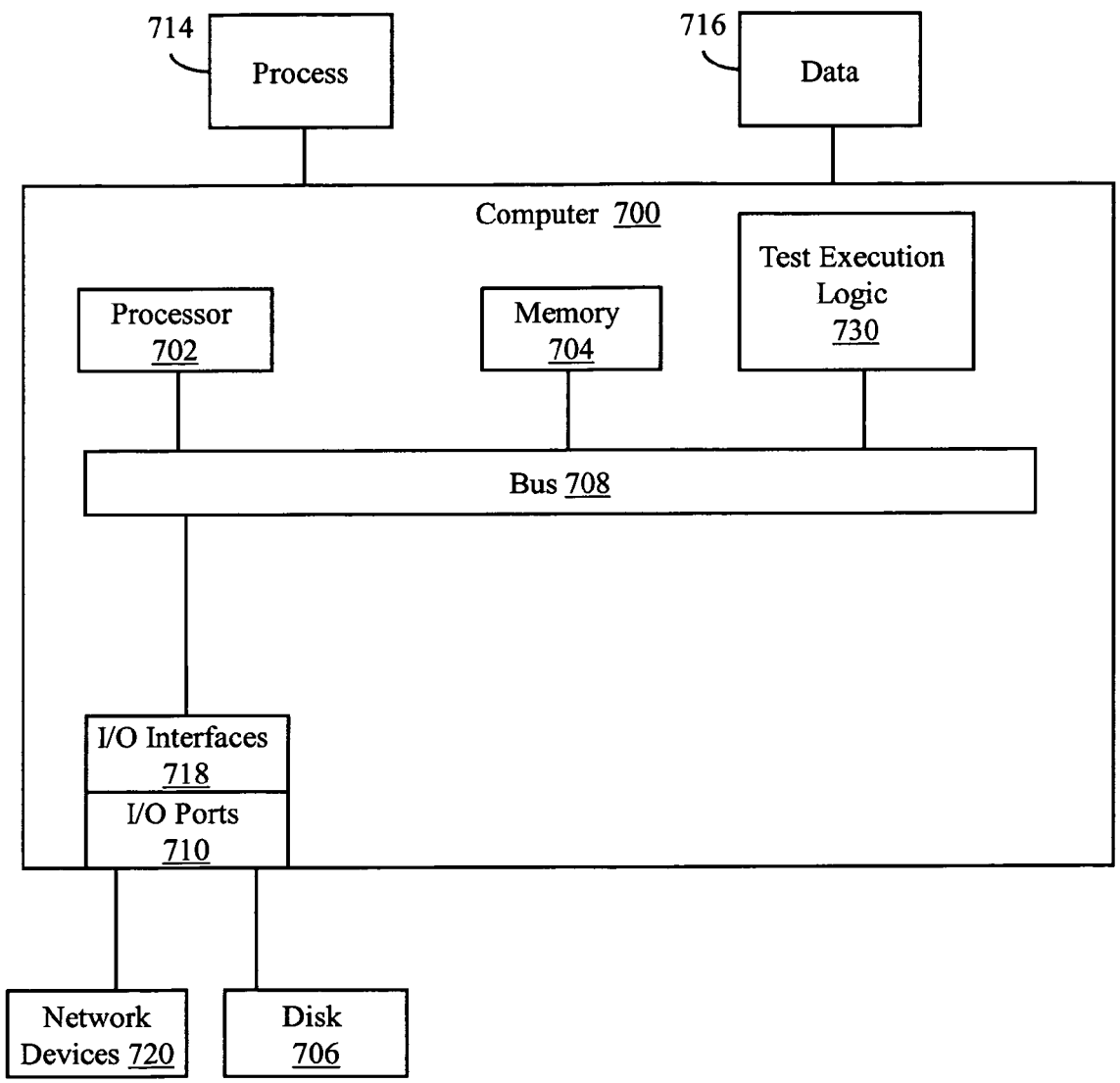
FIG. 7 illustrates an example computing environment in which example systems and methods, and equivalents, may operate.

FIG. 7 illustrates an example computing device in which example systems and methods described herein, and equivalents, may operate. The example computing device may be a computer 700 that includes a processor 702, a memory 704, and input/output ports 710 operably connected by a bus 708. In one example, the computer 700 may include a test execution logic 730 configured to facilitate test execution of SQLs in server code. In different examples, the logic 730 may be implemented in hardware, software in execution, firmware, and/or combinations thereof. While the logic 730 is illustrated as a hardware component attached to the bus 708, it is to be appreciated that in one example, the logic 730 could be implemented in the processor 702.

Logic 730 may provide means (e.g., hardware, software, firmware) for reproducing in an SQL execution engine an execution environment associated with a user SQL. The means may rely on environment data (e.g., bind values) provided to logic 730 through an API. Logic 730 may also provide means (e.g., hardware, software, firmware) for running the user SQL in server code in the SQL execution engine as controlled by the reproduced execution environment. The means may control processor 702 to run different processes 714 using values stored in memory 704. Logic 730 may also provide means (e.g., hardware, software, firmware) for capturing, while the user SQL runs in the server code, SQL-level statistics associated with the user SQL. The means associated with logic 730 may be implemented, for example, as an ASIC programmed to control test execution plans executed in a mock execution framework run on computer 700. The means may also be implemented as computer executable instructions that are presented to computer 700 as data 716 that are temporarily stored in memory 704 and then executed by processor 702.

Computer 700 therefore remedies issues associated with the fact that conventional systems could not execute user SQL code within server code. Computer 700 may execute user SQL code within server code and therefore can acquire statistics in a reproducible, deterministic mode. The statistics can even be acquired for partial performances. The statistics can be acquired while user SQL is test executed in an accurately reproduced and migratable environment. Running the text execution and acquiring the statistics will not significantly impact other portions of a database system associated with computer 700. Test execution of multiple plans can be interleaved to acquire meaningful statistics for comparing plans. Analysis of statistics associated with partially completed interleaved plans facilitates triaging (e.g., early termination) of plans identified as being least worthy of being allowed to complete.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM drive, a Blu-Ray drive, an HD-DVD drive, and so on. The memory 704 can store a process 714 and/or a data 716, for example. The disk 706 and/or the memory 704 can store an operating system that controls and allocates resources of the computer 700.

The bus 708 may be a single internal bus interconnect architecture and/or other bus or mesh architectures. While a single bus is illustrated, it is to be appreciated that the computer 700 may communicate with various devices, logics, and peripherals using other busses (e.g., PCIE, 1394, USB, Ethernet). The bus 708 can be types including, for example, a memory bus, a memory controller, a peripheral bus, an external bus, a crossbar switch, and/or a local bus.

The computer 700 may interact with input/output devices via the i/o interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interfaces 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, MB, MBB, MBBC, MBBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-readable medium storing computer-executable instructions that when executed by a computer cause the computer to perform a method, the method comprising:

producing a reproduced execution environment that reproduces at least a portion of an execution environment in which a user SQL runs;

running the user SQL in the reproduced execution environment;

capturing a statistic associated with performance of the user SQL while the user SQL runs in the reproduced execution environment; and performing one or more of, storing the statistic, displaying the statistic, and providing a signal concerning the statistic, where producing the reproduced execution environment includes creating a test execution framework in an SQL execution engine of a database, and where creating the test execution framework includes providing environment data concerning the execution environment in which the user SQL runs to the SQL execution engine of the database, where environment data is provided through an application programming interface.

2. The computer-readable medium of claim 1, where the environment data is captured when the SQL executes and where the environment data is transmittable to a system on which test execution is to occur.

3. The computer-readable medium of claim 1, where environment data includes one or more of, a bind value and an optimizer-relevant parameter value.

4. The computer-readable medium of claim 1, where the method includes migrating the reproduced execution environment to a remote database.

5. The computer-readable medium of claim 1, where running the user SQL in the reproduced execution environment includes one or more of, preventing acquisition of row locks, preventing modification of user data, and preventing sharing of a cursor with user SQL statements.

6. The computer-readable medium of claim 1, where running the user SQL in the reproduced execution environment includes executing two or more execution plans for a single user SQL, where the two or more execution plans are interleaved using loop-based serial time slicing, and where statistics are acquired for the two or more execution plans.

7. The computer-readable medium of claim 6, where the method includes one or more of, terminating an execution plan based, at least in part, on a comparison to a baseline performance, and selecting an execution plan as an improved execution plan based, at least in part, on a comparison to a baseline performance.

8. The computer-readable medium of claim 7, where the method includes comparing an execution plan to a baseline performance at times including one or more of, after a time slice, after a partial performance of a plan, and after completion of a plan.

9. The computer-readable medium of claim 6, where the method includes terminating an execution plan based on a comparison to another execution plan and where the method includes selecting an execution plan as an improved execution plan based on a comparison to another execution plan.

10. The computer-readable medium of claim 6, where the method includes selectively reallocating a test execution resource between executing test plans based, at least in part, on one or more of, a comparison of the executing test plans, and an algorithm with which the test plan was produced.

11. The computer-readable medium of claim 1, where capturing a statistic associated with performance of the user SQL while the user SQL runs in the reproduced execution environment includes acquiring one or more of, a CPU statistic, and an I/O statistic, where capturing the statistic includes isolating the statistic from statistics associated with other SQLs.

12. A system, comprising:
- a processor connected to a memory and to a set of logics, the set of logics comprising:
- a reproduction logic to create a reproduced execution environment for executing a user SQL in server code; and
- a test execution logic to run the user SQL in server code and to acquire and store a set of statistics concerning the user SQL as run in the reproduced execution environment in the server code,
- where the reproduction logic creates a mock execution framework in an SQL execution engine of a database based, at least in part, on environment data concerning an execution environment in which the user SQL runs, where the environment data includes one or more of, a bind value, an optimizer parameter value, and a real user data value.

13. The system of claim 12, where the test execution logic runs the user SQL without acquiring row locks, without modifying user data, and without acquiring a cursor associated with user data.

14. The system of claim 12, where the test execution logic executes two or more execution plans for a single SQL, where the two or more execution plans are interleaved using loop-based serial time slicing, and where the set of statistics includes one or more of, a CPU statistic and an I/O statistic, where the test execution logic terminates an execution plan based, at least in part, on a comparison of the set of statistics to a set of baseline performance statistics, and where the test execution logic selects an execution plan as an improved execution plan based, at least in part, on a comparison of the set of statistics to a set of baseline performance statistics, where the comparisons are performed at times including one or more of, after a time slice, after a partial performance of a plan, and after completion of a plan.

15. The system of claim 12, including an advice logic to provide a recommendation concerning modification of the user SQL, where the recommendation is based, at least in part, on the set of statistics.

16. The system of claim 15, where the advice logic includes one or more of:
- an SQL Tuning Advisor logic to validate an SQL profile recommendation based, at least in part, on the set of statistics;
- an SQL Performance Analysis logic to measure the set of statistics before and after a change to an execution plan;
- an SQL Repair Advisor logic to determine whether an SQL patch fixes one or more of, a wrong results issue associated with the user SQL and a crash issue associated with the user SQL; and
- an SQL Plan Management logic to evolve an SQL plan baseline based on a comparison of a first set of statistics acquired with the plan baseline in place and a second set of statistics acquired without the plan baseline in place.

17. A non-transitory computer-readable medium storing computer-executable instructions that when executed by a computer cause the computer to perform a method, the method comprising:
- creating a reproduced execution environment for executing a user SQL in server code;
- running the user SQL in server code and acquiring and storing a set of statistics concerning the user SQL as run in the reproduced execution environment in the server code; and
- creating a mock execution framework in an SQL execution engine of a database based, at least in part, on environment data concerning an execution environment in which the user SQL runs, where the environment data includes one or more of, a bind value, an optimizer parameter value, and a real user data value.

* * * * *

UNITED STATES PATENT AND TRADEMARK OFFICE
CERTIFICATE OF CORRECTION

PATENT NO. : 7,970,755 B2  Page 1 of 1
APPLICATION NO. : 12/217249
DATED : June 28, 2011
INVENTOR(S) : Belknap et al.

It is certified that error appears in the above-identified patent and that said Letters Patent is hereby corrected as shown below:

In column 13, line 54-55, delete "MB, MBB, MBBC, MBBCC," and insert -- AAB, AABB, AABBC, AABBCC, --, therefor.

Signed and Sealed this
First Day of November, 2011

David J. Kappos
*Director of the United States Patent and Trademark Office*